United States Patent [19]
Satzinger

[11] 3,951,429
[45] Apr. 20, 1976

[54] SAFETY DEVICE FOR THE OCCUPANTS OF VEHICLES, ESPECIALLY MOTOR VEHICLES

[76] Inventor: Roland Satzinger, Hammelburger Str. 21 a, D - 8731 Euerdorf, Germany

[22] Filed: Apr. 10, 1974

[21] Appl. No.: 459,817

[30] Foreign Application Priority Data
Apr. 13, 1974 Germany............................. 2318664
July 26, 1973 Germany............................. 2337925

[52] U.S. Cl.............................. 280/727; 296/65 A; 297/216
[51] Int. Cl.²......................................... B60R 21/06
[58] Field of Search.............. 280/150 B; 296/65 A, 296/65 R; 297/216

[56] References Cited
UNITED STATES PATENTS

| | | |
|---|---|---|
| 2,959,446 | 11/1960 | Thompson....................... 296/65 A |
| 2,993,732 | 7/1961 | Walker............................... 296/65 A |
| 3,524,678 | 8/1970 | DeLavenne..................... 280/150 B |
| 3,582,133 | 6/1971 | DeLavenne....................... 296/65 A |

*Primary Examiner*—Robert R. Song
*Attorney, Agent, or Firm*—Burgess, Dinklage & Sprung

[57] ABSTRACT

A motor vehicle equipped with a front seat having a seat portion and a back portion which front seat faces a dashboard having a room for the legs and knees of a passenger therebeneath which is improved by an energy dissipating dampening means attached articulately to said seat portion and an energy dissipating dampening means attached articulately to said back portion, said energy dissipating dampening means extending longitudinally of the motor vehicle and attached at the other end to a stationary portion of the motor vehicle.

10 Claims, 10 Drawing Figures

SAFETY DEVICE FOR THE OCCUPANTS OF VEHICLES, ESPECIALLY MOTOR VEHICLES

BACKGROUND OF THE INVENTION

Field of the Invention

The invention relates to a safety device for the protection of the occupants of motor vehicles, who are constantly in great danger due to high speeds. More especially the invention relates to a system of completely dampening the forces created during a motor vehicle accident. This invention is also directed to a means for safely limiting the movement of the head of a passenger seated in the back of a car so as to avoid facial and head injuries which could arise from an automobile accident.

DISCUSSION OF THE PRIOR ART

Many different kinds of safety devices for motor vehicles are known, examples being snap-on belts or body supports with energy dissipating dampers. None of these safety devices is sufficient, however, when the road speeds are too high. These safety devices have too short an energy-absorbing path and are not precisely adjustable for optimum damping. Furthermore, safety belts installed in the front seats do not protect occupants in the rear seats. The safety belts of the prior art have an energy-damping action in only one direction.

SUMMARY OF THE INVENTION

Thus, there has been a long felt desire to provide a safety device for a motor vehicle which has energy dampening actions in more than one direction. More specifically, it has become desirable to provide an energy absorbing means which absorbs the forces created when an automobile or other motor vehicle is involved in an accident or when it stops short. More particularly, it has become desirable to provide a means for completely restraining dangerous forward movement of a driver or passenger and to avoid injuries to the legs and knees of a driver and the face and head of a passenger seated in a rear seat.

The foregoing desires are satisfied by an improved motor vehicle equipped with a front seat having a seat portion and a back portion which front seat faces a dashboard having a room for the legs and knees of a passenger therebeneath which motor vehicle is improved by an energy-dissipating dampening means attached articulately to said seat portion and an energy-dissipating dampening means attached articulately to said back portion, said energy-dissipating dampening means extending longitudinally of the motor vehicle and attached at the other end to a stationary portion of the motor vehicle.

In accordance with the present invention there is provided energy dampening means attached to both the seat portion and the back portion of the seat. When the automobile or other motor vehicle is to have seats disposed behind the seat immediately facing the dashboard the energy dampening means connected to the seat portion of the front seat run along the exterior portion of the automobile proximate the portion to which a running board would be attached. The longitudinally running dampening means fixed to the back portion of the seat is disposed in the center of the automobile generally proximate the center of gravity. By so disposing such energy-dissipating dampening means proximate the center of the interior of the motor vehicle the center of gravity lies approximately in the center of the mass.

In a particularly desirable embodiment of the invention there is provided a means for limiting the downward movement of the head of a passenger seated in a rear seat. This is done by providing a readily deformable shaped member positioned on the back of a seat in facing relationship to a rearward seat which can catch the head of a passenger in the rearward seat as it is thrust downward during an accident. The shaped member is releaseably connected to a rearwardly disposed energy-dissipating dampening means so that a maximum dampening effect can be provided.

The problems attendant prior art safety devices are, therefore, solved by providing energy dissipating dampers connected both to the seat and to the seat back which dampers hold the seat in relation to the car body. The dampers can be disposed on both sides of the seat back and/or of the seat.

The front seat is carried in seat guides and is fastened through the dampers directly or indirectly, e.g., through another part in the rearward portion of the vehicles.

The front seat passengers are fastened by body holders or by three-point or "suspender"-type belts of a low-stretch belt material to the front seat and to the front seat back.

In the event of a crash, therefore, a comparatively long energy-dissipating path is provided for the human body on the seat within the passenger compartment of the vehicles.

In one embodiment, the dampers can also be attached at the bottom, for example, to the seat on the door side, and at the top they can be fastened to the seat back in the middle of the width of the vehicle, so as to minimize the racking effect on the seat guide. Depending on how the vehicle is occupied, if the rear seat passengers are not provided with extra belts, energy-dissipating dampers must be able to be turned on or off according to the variations of the mass that is to be damped.

The steering wheel and controls are desirably retractable and extendable so as to make the energy-dissipating path as long as possible. If the rear seats are not occupied, the front seats are set back all the way and the steering wheel is adjusted accordingly. This makes the energy-dissipating path longer and thus more effective.

The connection between the back of the front seat and the rear portion of the vehicle may also be in the form of energy dissipating dampers and a shaped portion that may be swung upwardly, which is articulated to the seat back. In this manner a force-transmitting connection can be produced between the back of the front seat and the back seats at the center of gravity of the mass to be damped; this makes it possible to join the back of the front seat by snap fastening means to energy dissipating dampers which are anchored in the rearward portion of the vehicle.

To enable the shaped portion to be separated from the dampers and connected thereto from the front seat, actuating members are installed and carried in the shaped portion.

Many vehicles provide too little clearance under the dashboard to enable the foot to rest on the floor with the knee and lower leg vertical; therefor, a leg guide of foam material is provided which spreads the legs slightly to enable them to fit under the dashboard.

To prevent the feet from being hurled too far forward in a crash, a restraining device is provided on the floor in the area of the feet so that the knee will be able to flex without injurious resistance.

If there is no passenger in the rear seat, the front seat is set all the way back; in that case, the energy-dissipating action must be reduced. This may be brought about automatically by the rearward shifting of the seat.

When the rear-seat passengers are entering or leaving the shaped part is folded up so that the space is not encumbered by a fixed safety cushion.

BRIEF DESCRIPTION OF DRAWINGS

The drawings illustrate embodiments of the safety device for the protection of the human body.

DESCRIPTION OF PREFERRED EMBODIMENTS

Figure 1:
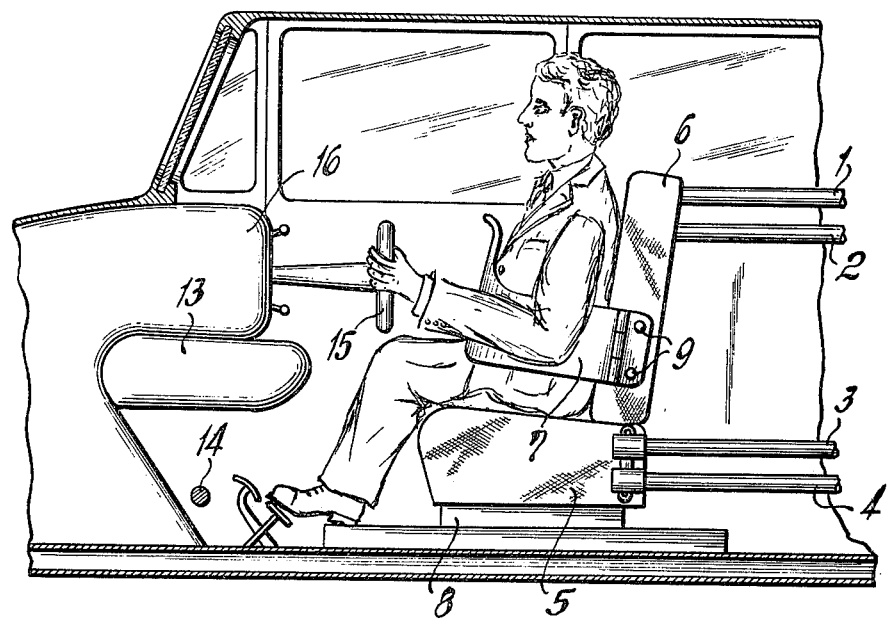
FIG. 1 is a view showing how the dampers, the body restrainer, the leg guiding means and the toe bar are constructed.

FIG. 1 shows the dampers 1 to 4 which are attached to the seat 5, the seat back 6 and, at the other end towards the trunk space, the body. The body restrainer 7 is disposed on the seat back 6 and the snap-in fasteners 9 serve for the rapid opening and closing of the body restrainer 7.

The leg guide 13 is made of easily deformable material and only serves to guide the legs over the energy-dissipating distance in such a manner that they will not collide and so that they will thus enter into the knee space provided without suffering injury.

The toe bar 14 completes the leg guiding means 13 insofar as the feet will not be hurled too far forward and will permit safe flexing at the knees.

The steering wheel 15 can slide in and out of the dashboard, so that the steering wheel 15 will not interfere with the energy-dissipating path and so as to permit the latter to be adjusted insofar as possible.

Figure 2:
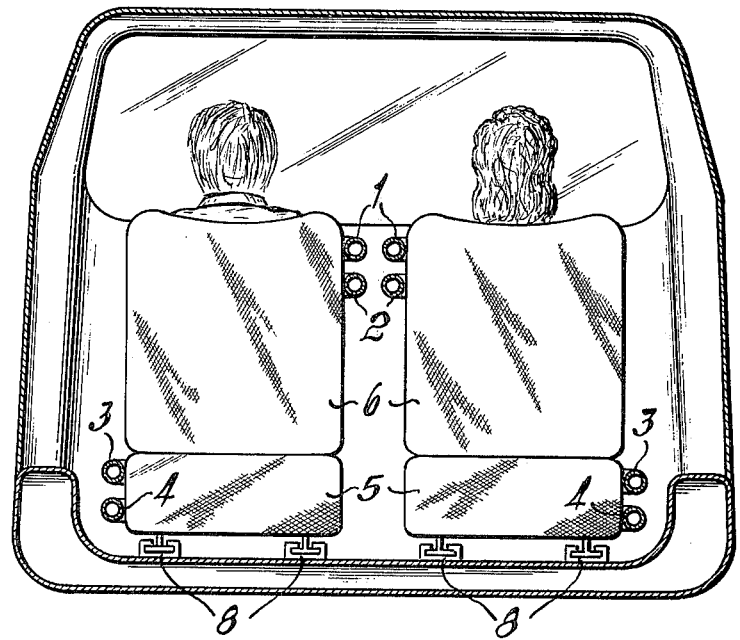
FIG. 2 is a view looking forward from the back seats, showing the set guiding means, and the energy-dissipating dampers.

In FIG. 2 the energy dissipating dampers 1 to 4 are arranged so as to minimize racking or skewing in the seat guides 8. The dampers 3 and 4 are fastened close to the running board and the dampers 1 and 2 are fastened to the seat back 6 virtually in the center of the vehicle.

Figure 3:
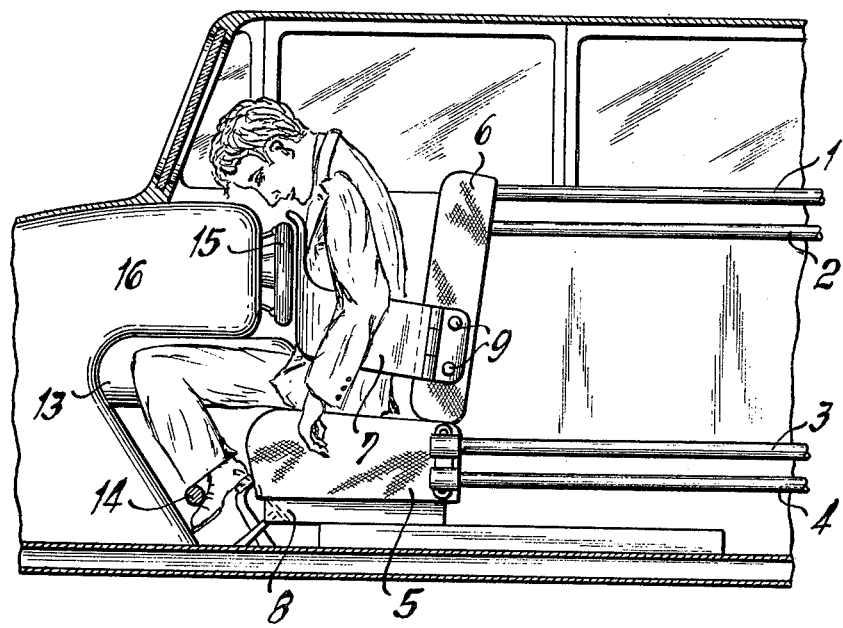
FIG. 3 is a view of the body almost at the end of the energy-dissipating path, showing the toe bar in operation.
Figure 4:
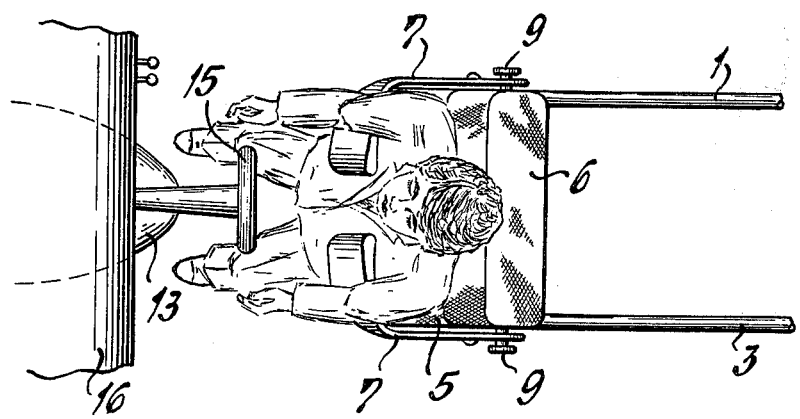
FIG. 4 is a top view of the driver's seat, showing the body restrainer and snap-in fasteners as well as the energy-dissipating dampers and a portion of the leg guiding means.

FIG. 3 shows how the knee is to be located. The legs here are spread apart by the leg guide 13 so that there is room for them in the leg area. The toe bar 14 has held the foot at the end of the energy-dissipating path. The steering wheel 15 has retracted completely into the dashboard FIG. 4 shows the projecting portion of the leg guide 13, the body restrainer 7 which can be opened or adjusted on both sides owing to the snap-in fasteners 9.

Figure 5:
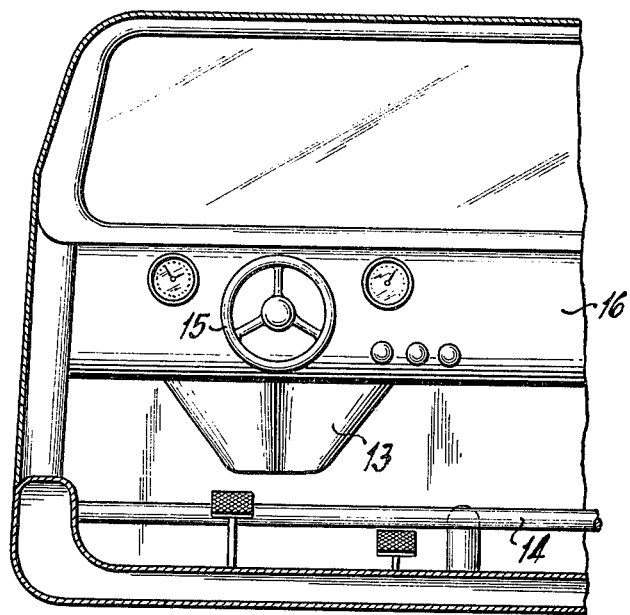
FIG. 5 is a view of the dashboard from the driver's seat, showing the toe bar and the leg guiding means.

FIG. 5 shows the view seen by the driver of the leg guide 13 and toe bar 14, as well as the steering wheel 15.

Figure 6:
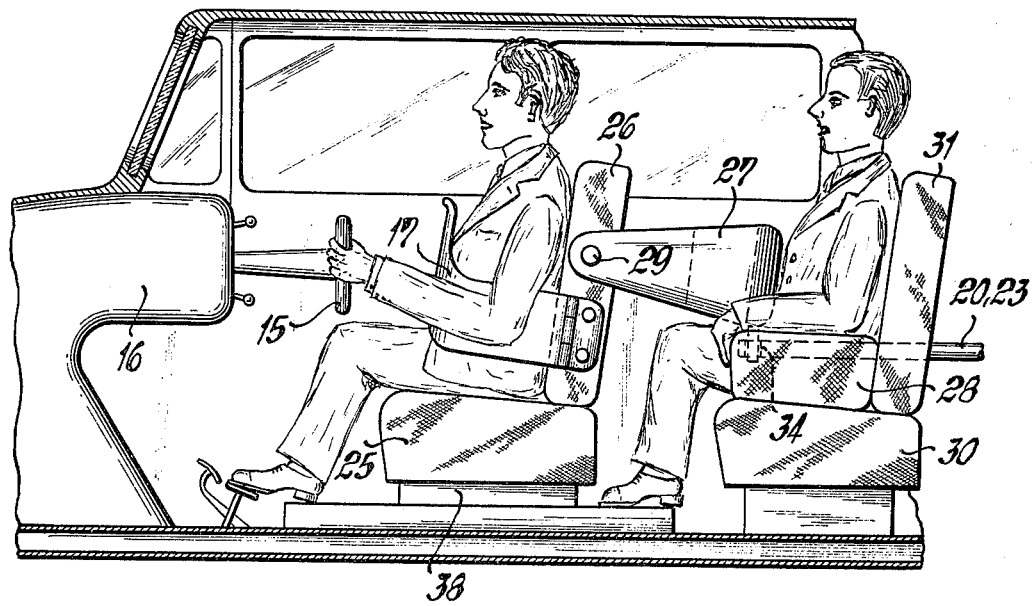
FIG. 6 is a view showing how the shaped part joins the back of the front seat to the energy-dissipating dampers.

FIG. 6 shows a shaped part 27 which is pivoted to the seat back 26 and snapped into the energy-dissipating dampers 20 to 33. The armrests 28 encase the dampers 20–23 with the snap-fasteners 34 which are joined to the dampers 20–23. Thus, by means of the shaped part 27, with its stud 33 engaged in socket 34, an energy-transmitting linkage is created between the energy-dissipating dampers 20–23, which are fastened in the rear portion of the vehicle, and the mounting 29 and seat back 26.

Figure 7:
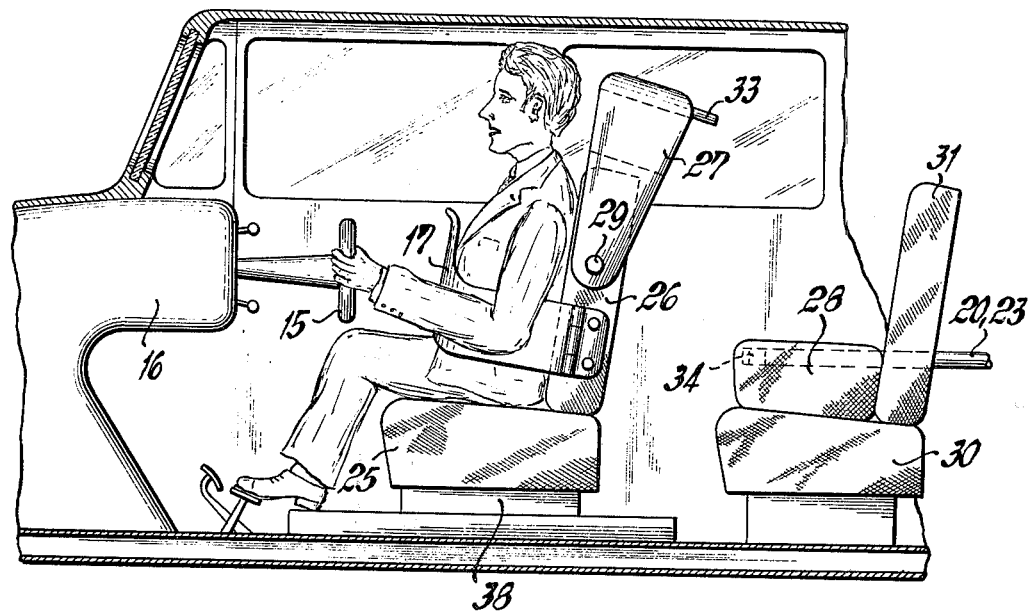
FIG. 7 is a view in which the shaped part has been turned up thereby permitting the rear-seat passengers to enter and leave.

In FIG. 7 the shaped part 27 is folded up under the roof, exposing the studs 33. In this position the path is free to permit passengers to enter or leave the rear seat 30 with back 31.

Figure 8:
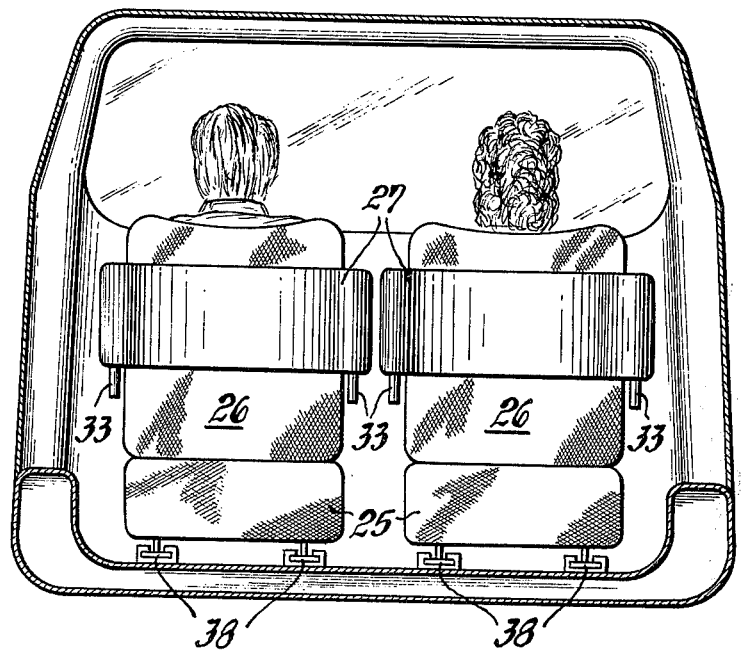
FIG. 8 is a view towards the front from the back seats, showing the shaped parts on the front seat backs and the seat guiding means of the front seat.

In FIG. 8 the shaped part 27 is shown as viewed from the rear seats 30. The armrests 28 with the socket 34 are not shown, so that the studs 33 can be seen. Also shown is the guide 38 of the front seat 25, through which the energy-dissipating path is guided.

Figure 9:
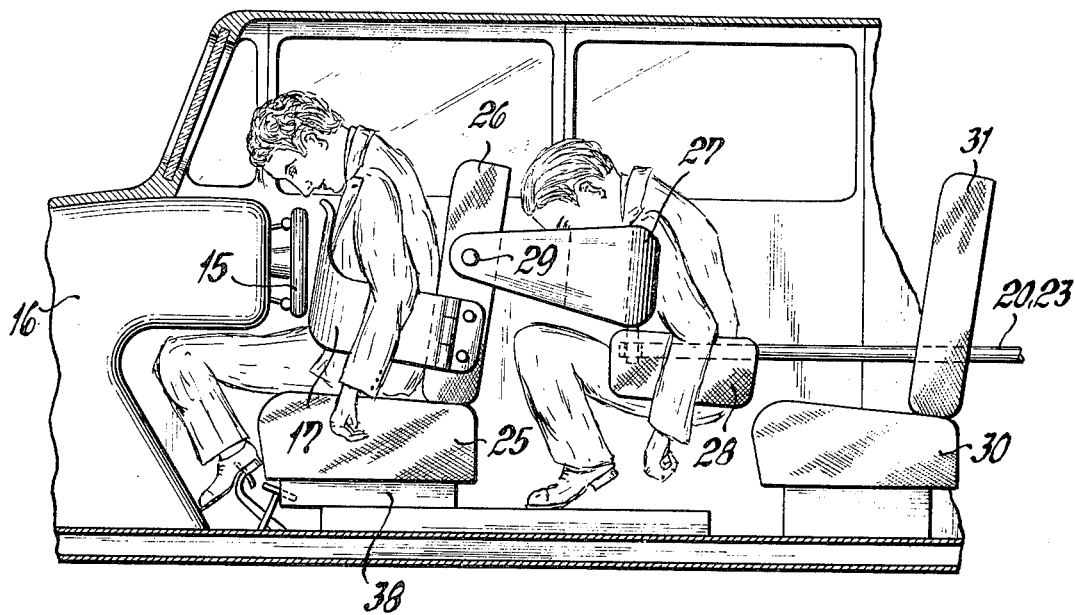
FIG. 9 is a view of the two bodies near the end of the energy-dissipating path with the dampers fully extended which hold in an energy-dissipating manner the two bodies, the shaped part, the front seat and the body restraints guided in the seat guides.

FIG. 9 shows how the two bodies are held at a point near the end of the energy-dissipating path. Body [restrainer] 37 corresponds to body restrainer 7 of FIG. 1.

Figure 10:
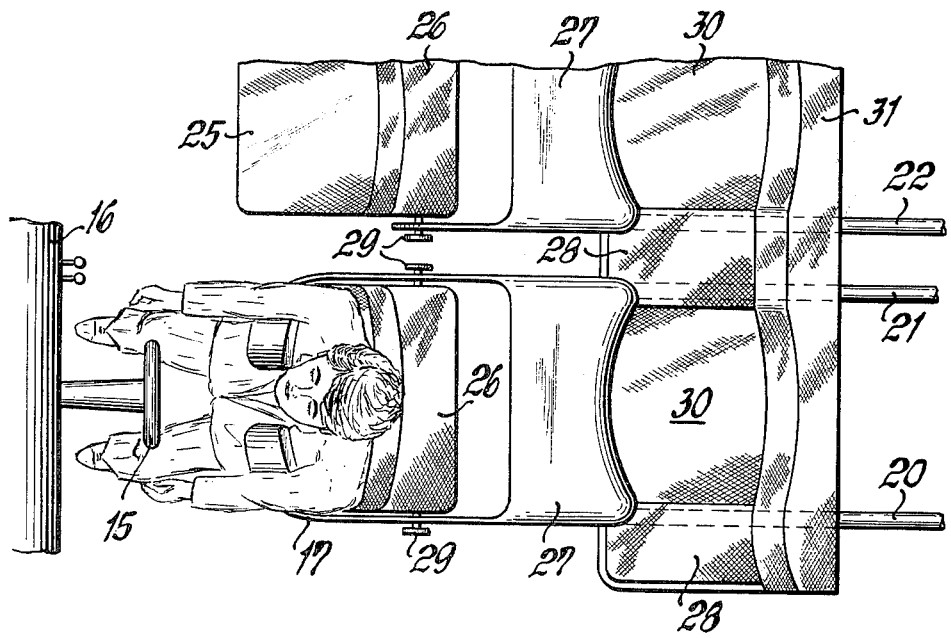
FIG. 10 is a top view of the seat, the shaped parts, the armrests, the body restrainers and the energy-dissipating dampers.

FIG. 10 shows a top view of the seat back 26 with mounting 29 and the shaped parts 27 and the energy-dissipating dampers 20–22, and the rear seat 30 with back 31 and the armrests 28 which house the dampers 20–22.

ADVANTAGES OF THE INVENTION

1. Optimum action, due to the constant, maximum restraining force that can be sustained without injury by the human body, which is exercised over the entire energy-dissipating path (that is, not the poorly effective initial expansion followed by excessive tension as in the safety belts of the prior art).

2. As soon as the belts are taut the full restraining force is exerted immediately upon the occupants, thereby causing the occupants to participate to a much greater extent than hitherto in the deceleration of the vehicle. In this manner the crumple effect becomes much more advantageous for the occupants.

3. The optimum energy-dissipating action works on the passengers both in the forward and in the rearward direction, to the full extent.

4. After a first collision the occupants still are held tightly in the seats, so that they participate in the deceleration of the vehicle if it capsizes and they will undergo additional energy-dissipating movements with the seat. Even if the vehicle tumbles forward, the damping action will then work rearwardly and the occupants will immediately participate in the vehicle deceleration, since they are sitting on the seat.

5. Only through this construction is it possible to absorb the shock on the occupants and at the same time give the rear seat passengers room for an energy-dissipating travel by the forward movement of the front seat. Whether the rear-seat passengers are to be restrained by belts or by the shaped portion is a question of design. The rear-seat passenger safety belts may also be attached to the energy-dissipating dampers.

6. The seat back is so firmly attached by the connecting means to the dampers which are fastened in the rear that the better "suspender"-type safety belts may be fastened to the seat back. The suspender-type belt prevents the upper torso from following the swing of the head, which appreciably increases the energy-dissipating path available and decidedly reduces head injuries.

7. Since the front seat occupants are fastened to the seat and seat back by belts and the seat is carried in the seat guide, the occupants can reliably be guided in the longest energy-dissipating path that is available, the head being above the dashboard and the knees under the dash-board at the end of the energy-dissipating path.

8. Particularly in the case of small and light automobiles in which only one or two passengers usually travel, it is important to utilize the short energy-dissipating path in the best possible manner and to increase the forward path considerably by setting the front seat back and snapping it onto the energy-dissipating dampers. Since in the event of a collision from the rear the restraining force in a seat with a head support may be higher in the rearward direction, the deformation of the rear seat, etc., cannot produce an injuriously disadvantageous effect since the entire vehicle with its occupants must first be accelerated, and the crumple effect will be fully exercised.

9. This safety device does not need first to be placed in readiness by actuating systems: it is always in full effect, ready to protect the occupants. It is thus an absolutely simple and reliable system.

What is claimed is:

1. In a motor vehicle equipped with a stationary vehicle floor and a front seat longitudinally slidably mounted on said vehicle floor and having a seat portion and a back portion which faces a dashboard, the improvement comprising an energy-dissipating dampening means extending entirely rearwardly of said seat portion and attached articulately to said seat portion and an energy-dissipating dampening means extending entirely rearwardly of said back portion and attached articulately to said back portion, said energy-dissipating dampening means extending longitudinally of the motor vehicle and attached at the other end to a stationary portion of the motor vehicle, said seat being independently dampened from any other seat of said motor vehicle.

2. A motor vehicle according to claim 1 wherein there are a plurality of energy dissipating dampening means attached to said seat portion and said dampening means is disposed on both sides of said seat portion and said motor vehicle has a plurality of dampening means attached to said back portion which dampening means are disposed on both sides of said back portion.

3. A motor vehicle according to claim 2 wherein the energy dissipating dampening means attached to the seat portions are disposed toward the bottom of said seat portions and run proximate the exterior wall of said motor vehicle the energy-dissipating dampening means attached to the back portion being disposed proximate the center of the interior of said motor vehicle and running longitudinally so that the center of gravity lies approximately in the center of the mass.

4. A motor vehicle according to claim 3 wherein there are additional energy-dissipating dampening means which additional energy-dissipating dampening means are removably connected to a seat.

5. A motor vehicle according to claim 3 wherein there is a back seat disposed behind said front seat, said back seat faces said front seat, said back seat comprises a seat portion and a back portion and there is pivotally hingedly connected to the back portion of said front seat a shaped member which member extends toward said back seat and is engageable by the face of a passenger seated in said back seat; said shaped member being connected to an energy-dissipating dampening means which runs longitudinally within said motor vehicle and is attached to a stationary part thereof.

6. A motor vehicle according to claim 5 wherein said shaped part is releasably connected to said dampening means.

7. A motor vehicle according to claim 1 further comprising a leg guiding means of an easily deformable material which leg guiding means is disposed in facing relationship to said front seat in said motor vehicle, said guide having surfaces which when engaged by legs quickly disposed thereagainst guide said legs into the area disposed beneath said dashboard.

8. A motor vehicle according to claim 7 further characterized by a toe holding means disposed across said motor vehicle in the form of a bar which is engageable by the toes of a passenger in said motor vehicle to restrain the foot from moving forward and to cause the body to assume a crouched position by a safe flexing of the knees.

9. A motor vehicle according to claim 1 wherein said dampening means comprises a spring.

10. A motor vehicle according to claim 1 wherein the energy dissipating dampening means attached to said seat portion is separate and distinct from the energy dissipating dampening means attached to said back portion.

* * * * *

UNITED STATES PATENT AND TRADEMARK OFFICE
CERTIFICATE OF CORRECTION

PATENT NO. : 3,951,429
DATED : April 20, 1976
INVENTOR(S) : Roland Satzinger

It is certified that error appears in the above-identified patent and that said Letters Patent are hereby corrected as shown below:

[30] "April 13, 1974" should read -- April 13, 1973 --.

Signed and Sealed this

Seventeenth Day of August 1976

[SEAL]

Attest:

RUTH C. MASON
*Attesting Officer*

C. MARSHALL DANN
*Commissioner of Patents and Trademarks*